United States Patent [19]

Fleming

[11] 3,763,825
[45] Oct. 9, 1973

[54] ANIMAL FEEDER
[76] Inventor: William N. Fleming, 542 Arden Dr., Indianapolis, Ind. 46220
[22] Filed: June 14, 1972
[21] Appl. No.: 262,796

[52] U.S. Cl. .......................... 119/51.12, 119/51.15
[51] Int. Cl. .............................................. A01k 5/02
[58] Field of Search .................... 119/51.12, 51.14, 119/51.15, 56 A

[56] References Cited
UNITED STATES PATENTS
1,214,881  2/1917  Berntzen ........................... 119/56 A
3,638,618  2/1972  Strother ........................... 119/51.12
2,534,444  12/1950  Hedwall et al. ..................... 119/51.12

Primary Examiner—Louis G. Mancene
Assistant Examiner—J. A. Oliff
Attorney—Harold B. Hood

[57] ABSTRACT

A pet feeder comprising a cabinet internally divided into a plurality of separate compartments opening individually through the external perimeter of the cabinet, a bottom-hinged door for each of certain of the compartments, each door being biased away from closed position, a latch device for each door, and a timer operative to release the latch devices successively and at stated time intervals. In a preferred embodiment of the feeder, the timer includes an arm which sweeps a calibrated dial once in 72 hours and the latch-release devices are peripherally spaced from each other by 120° about the dial.

8 Claims, 3 Drawing Figures

PATENTED OCT 9 1973  3,763,825

ANIMAL FEEDER

The present invention relates to a pet feeder. It is primarily intended to serve a cat, and will be described in that relationship, although it will be apparent that it can be used for any other kind of ambulatory pet which may be left alone in a house or any other enclosure for relatively long periods of time.

A well-trained house cat will conduct himself politely when left alone for days at a time; but he must, of course, be provided with adequate food supplies. A cat should eat once a day and he would frequently gorge himself if excessive quantities of food are exposed to him. Therefore, only an adequate quantity of food should be made available to him, preferably at the same time every day.

This is, of course, no serious problem when a householder is in the house at the proper time each day. But often a householder will wish to take a week-end or other trip to be absent from the house for two, three or even four days at a time. Most cats are unhappy when removed from their customary environments to a strange kennel; and it is an imposition to ask a neighbor, relative or friend to care for a cat in his own home or even to feed the cat daily in the owner's home. Furthermore, since some cats become lonely, there is always the possibility that a cat may run away from a different home, or even from its own home when someone opens the door to come in and feed it.

My present invention solves these problems by providing means whereby, at a predetermined time each day, a measured supply of food will be exposed to access by the cat. In the illustrated embodiment of my invention, such exposure will occur on one, two or three successive days; but it will be apparent that, by obvious structural modification, the mechanism may be designed to offer food on a greater plurality of successive days or at more frequent intervals.

The primary object of the invention is to provide a structure including a plurality of compartments, each closed by a latchable door and into which a measured quantity of food may be placed, together with power means for successively unlatching the several doors at stated intervals. A further object of the invention is to provide such a device in which the mechanism is effectively guarded against manipulation by the cat. A further object of the invention is to provide such a device in which there is a minimum of moving parts, whereby not only is the original cost of the device minimized, but also the risk of mechanical failure is almost completely obviated.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
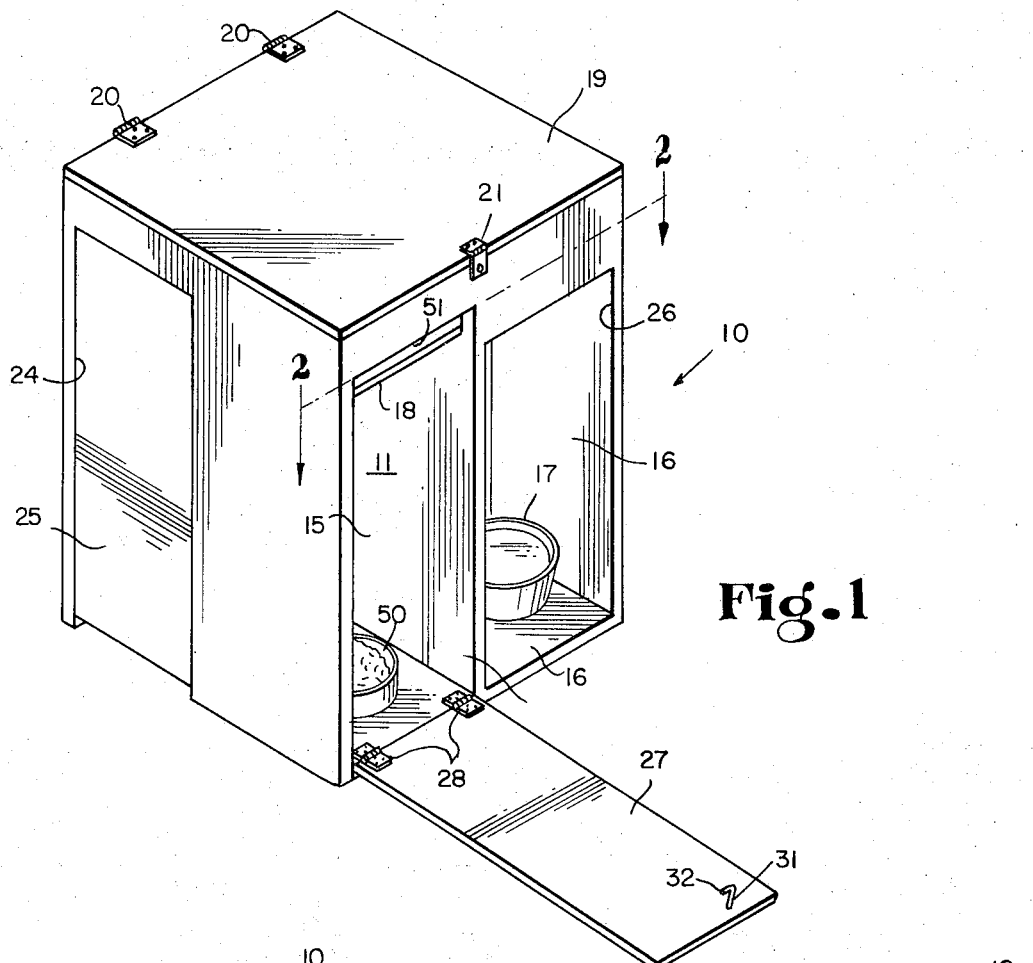
FIG. 1 is a perspective view of a pet feeder constructed in accordance with the present invention.

Referring more particularly to the drawings, the reference numeral 10 indicates generally a cabinet which, in the illustrated embodiment, is rectangular in horizontal cross section. Vertical partitions 11 and 12 divide the interior of the cabinet into compartments 13, 14, 15 and 16, closed from each other and each opening through a vertical wall of the cabinet.

In the illustrated embodiment of the invention, the compartment 16 is not provided with a door; and a container 17 for water may be placed in that compartment, where it will be available at all times to the cat. Cats do not require much water and I have found that a pan or bowl such as that illustrated at 17 will contain an adequate supply for the three days for which the illustrated form of cabinet is designed.

A ceiling 18 closes the upper ends of all four compartments, and a cover or lid 19 is supported by hinges 20 and is provided with a hasp 21 for securing the cover in closing position. As illustrated, the hinges 20 are connected to the rear wall of the cabinet.

An opening 22 in one side wall of the cabinet extends slightly above the ceiling 18 and communicates with the compartment 13. A door 23 is hinged to the bottom of the cabinet and is proportioned and designed to close the opening 22. A similar opening 24 in the opposite side wall of the cabinet communicates with the compartment 14 and is provided with a similar door 25, while a third opening 26 in the front wall of the cabinet communicates with the compartment 15 and is provided with a similar door 27 hingedly secured to the bottom of the cabinet by hinges 28.

Each door 23, 25, 27 will be, in some way, biased toward open position. In the illustrated embodiment of my invention, the hinges 28 are spring hinges which urge the upper end of the associated door outwardly from closed position. Alternatively, other spring means could be employed, or the doors could be so designed that, when in closed position, they are inclined slightly outwardly so that gravity will tend always to open them. The bottom hinging of the doors is advantageous, not only so that gravity will assist in moving them to completely-open position, but also to guard against the possibility of a door falling upon the animal while it is engaged in feeding.

Near its upper end, and so located as to be disposed between the lid 19 and the ceiling 18 when the door is in closed position, each door carries a stationary hook 29, 30 or 31. Each hook comprises a stem which may be preferably threaded into the door and a toe 32 turned at an angle of approximately 90° relative to the stem. As is most clearly to be seen in FIG. 2, the stems 32 all extend horizontally in the same direction relative to the movement of the actuator mechanism to be described.

Figure 3:
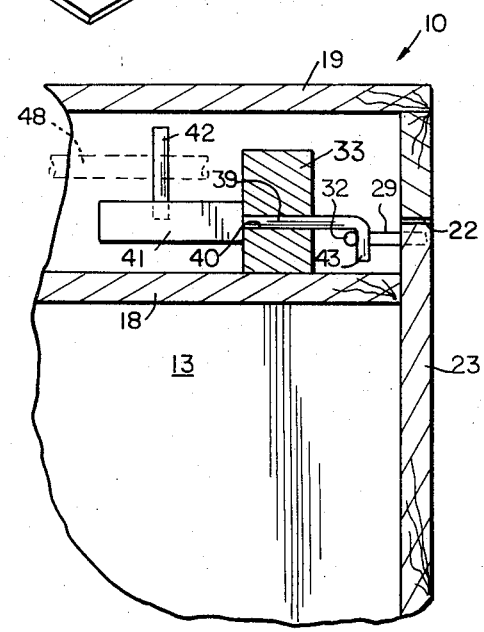
FIG. 3 is a fragmentary, enlarged section taken substantially on the line 3—3 of FIG. 2.

In the illustrated embodiment of the invention, battens 33, 34 and 35 are secured to the upper surface of the ceiling 18, and each batten is formed, at a suitable point, with a bore 40 (FIG. 3). Movable latch hooks 36, 37 and 38 are mounted in said battens for cooperation with the door hooks 29, 30 and 31. As is most clearly to be seen in FIG. 3, each latch hook comprises a stem 39 journalled in a batten bore 40 for oscillation about its own axis, a block 41 fixed to said stem at its proximal end, a radial abutment finger 42 and a toe 43 at its distal end bent at approximately 90° relative to the stem and, in the illustrated embodiment of the invention, extending radially in a direction opposite the direction of extension of the finger 42.

It will be apparent that, after a bowl 50 of food has been placed in the compartment 15, for instance, the door 27 may be manually moved to closed position, the hook 31 entering the slot 51 above the ceiling 18 to be disposed just below the toe 43 of the movable hook 38. Now, the finger 42 or block 41 of that movable hook may be turned in a clockwise directon as viewed from the left in FIG. 3 to turn the toe 43 downwardly into retaining engagement with the toe 32 of the door hook 29 to restrain the door 23 against opening movement.

The output spindle 44 of a timer motor 45 is disposed at a point substantially concentric with the abutment fingers 42 by securing the motor 45 to the upper surface of the ceiling 18. As shown, and preferably, the motor 45 is spring-driven and has a winding key 46. In the illustrated embodiment of the invention, the motor 45 is so proportioned and designed that its spindle 44 will make one complete revolution in 72 hours. An adjustable mounting 47 secures to said spindle 44 an actuator arm 48 proportioned and designed to sweep a dial calibrated, as at 49, to hourly intervals, and to sweep, as well, the abutment fingers 42.

Figure 2:
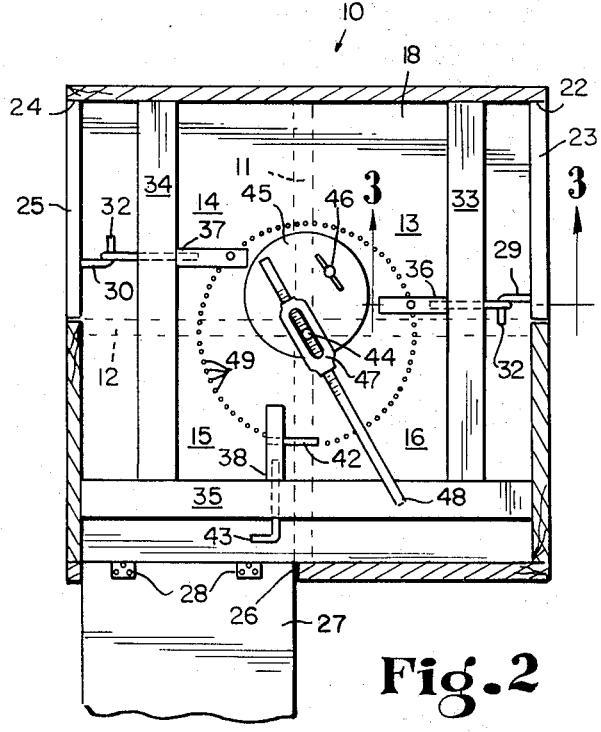
FIG. 2 is a horizontal section taken substantially on the line 2—2 of FIG. 1.

Quite obviously, as the arm 48 moves in a counterclockwise direction as viewed in FIG. 2, it will successively encounter the fingers 42. The movable hooks 36, 37 and 38 are disposed at equal intervals of 120° (24 hours). As the arm 48 encounters each finger 42, it will act to entrain that finger and to turn the associated movable hook in a counterclockwise direction as viewed from the left of FIG. 3 to cause the toe 43 to be turned into parallelism with the associated toe 32, thus breaking the engagement between the two toes and allowing the associated door to fall open.

The dial with its hourly calibration is quite important, since it facilitates an initial setting of the arm 48 to accomplish the intended function. If, for instance, the householder wishes to leave on a trip early on a Friday afternoon, he may set the arm 48, for instance, 23 calibrations in a clockwise direction away from the hook 36, at 1:00 P.M. on Friday. The arm 48 will then encounter, and release, the hook mechanism controlling the door 23 at 12:00 on Saturday. It will then release the hook 37 at 12:00 on Sunday and will release the hook 38 at 12:00 on Monday so that, if the householder does not return until late on Monday or even until sometime in the morning on Tuesday, the pet will be fed with complete regularity during the whole period of the householder's absence.

It is important that the entire operating mechanism for the feeder is housed between the ceiling 18 and the cover or lid 19, and that the cover is affirmatively retained in closed condition. Cats, as well as some other pets, are curious, ingenious and clever. By thus enclosing the operating mechanism, pets are affirmatively prevented from interfering with the operating mechanism. If desired, a padlock may even be used to hold the hasp 21 in retaining condition. On the other hand, such location of the operating mechanism is a great convenience to the householder since everything which requires attention is so disposed as to be readily and conveniently manipulable when the cover 19 is open.

The spring wound motor is highly desirable as contrasted with an electric motor because a power failure, or accidental dislodgement of a connecting plug could so easily render an electric motor inoperative.

Obviously, if a householder is to be gone for a shorter period, he may load only one or two of the compartments 13, 14 and 15. The invention as illustrated and described may be modified by changing the cross sectional contour of the cabinet 10 and modifying the partition structure to provide for additional, separated compartments, each with its own door and latch mechanism. If desired, the compartment 16 could be provided with a closure and could be used to contain dry ice, in which case the bowl 17 would be located outside the cabinet and suitable openings would be formed in the partitions 11 and 12 to permit circulation of cooled air among the several compartments.

It is to be noted that the hooks 29, 30 and 31 are variously located on the doors 23, 25 and 27 to accommodate the equiangular distribution of the movable hooks 36, 37 and 38.

I claim as my invention:

1. A pet feeder comprising a cabinet interiorly divided into a plurality of separate compartments opening individually through the perimetral wall of said cabinet, a bottom-hinged door for each of a plurality of said compartments, each door being biased away from closed position, releasable retainer means for temporarily holding each door in closed position, and timer means for successively releasing said retainer means at predetermined intervals.

2. The feeder of claim 1 in which one of said compartments is without a door.

3. The feeder of claim 1 including ceiling means for said compartments, said doors extending to a level above said ceiling means, each retainer means including a first hook carried by its door and extending inwardly into said cabinet when its door is closed, and a second hook movably mounted in said cabinet above said ceiling means and movable between a position of engagement and a position of disengegement with said first hook, and said timer means including means mounted in said cabinet above said ceiling means and adapted operatively to engage said second hooks successively to move them, at predetermined intervals, from their positions of engagement to their positions of disengagement relative to said first hooks.

4. The feeder of claim 3 in which each hook comprises a stem and a toe substantially perpendicular to its stem, said second hooks being mounted for oscillation about their respective stem axes.

5. The feeder of claim 4 in which the stem of each second hook is provided with a radial abutment and said means adapted to engage said second hooks is an arm fixed to a rotating spindle element of said timer means in a plane intersected by each of said abutments.

6. The feeder of claim 5 including a calibrated dial on the upper surface of said ceiling means, concentric with said spindle and swept by said arm.

7. The feeder of claim 3 including a hinged cover cooperating with the upstanding perimetral wall of the cabinet and with said ceiling means to define an enclosure for said retainer means and said timer means.

8. The feeder of claim 6 in which said dial is calibrated to 72 equi-angularly spaced digits, said radial abutments are 24 digits removed from each other and said arm fully sweeps said dial once in 72 hours.

* * * * *